(12) United States Patent
Yoder et al.

(10) Patent No.: US 11,081,898 B2
(45) Date of Patent: Aug. 3, 2021

(54) ELECTRICAL BATTERY DE-BONDING

(71) Applicant: Microsoft Technology Licensing, LLC, Redmond, WA (US)

(72) Inventors: Gregory S. Yoder, Sammamish, WA (US); Scott Douglas Bowers, Woodinville, WA (US); Craig D. Owen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 16/222,729

(22) Filed: Dec. 17, 2018

(65) Prior Publication Data
US 2020/0195025 A1  Jun. 18, 2020

(51) Int. Cl.
*H02J 7/00* (2006.01)

(52) U.S. Cl.
CPC .......... *H02J 7/0042* (2013.01); *H02J 7/0063* (2013.01)

(58) Field of Classification Search
USPC .................................. 320/126–136
See application file for complete search history.

(56) References Cited

U.S. PATENT DOCUMENTS

| | | | |
|---|---|---|---|
| 6,620,308 B2 | 9/2003 | Gilbert | |
| 7,465,492 B2 | 12/2008 | Gilbert | |
| 7,780,419 B1 | 8/2010 | Matheny | |
| 8,333,437 B2 | 12/2012 | Matsuda | |
| 9,737,060 B1 | 8/2017 | Rancho | |
| 2007/0023382 A1* | 2/2007 | Sandberg | B65D 21/0205 215/232 |
| 2007/0269659 A1 | 11/2007 | Gilbert | |
| 2009/0079803 A1 | 3/2009 | Mimura | |
| 2009/0114344 A1 | 5/2009 | Barinov | |
| 2009/0274953 A1 | 11/2009 | Myers et al. | |
| 2011/0193362 A1 | 8/2011 | Prahlad et al. | |
| 2013/0265010 A1* | 10/2013 | Nomura | H02J 7/0068 320/134 |
| 2014/0287299 A1 | 9/2014 | Krogdahl | |
| 2015/0084157 A1* | 3/2015 | Tegen | H01L 28/90 257/528 |
| 2017/0355892 A1 | 12/2017 | Heucher | |

FOREIGN PATENT DOCUMENTS

EP        3199344        8/2017

OTHER PUBLICATIONS

Choothum, et al., "Morphology and Surface Chemistry of Kissing Bonds in Adhesive Joints Produced by Using ElectRelease™ Adhesive", In Journal of Adhesion, vol. 87, Issue 4, Apr. 29, 2011, pp. 291-312.
"International Search Report and Written Opinion Issued in PCT Application No. PCT/US2019/064560", dated: Mar. 27, 2020, 13 Pages.

* cited by examiner

Primary Examiner — Binh C Tat
(74) Attorney, Agent, or Firm — Holzer Patel Drennan (57) ABSTRACT

A system for electrically de-bonding a battery from an electronic device includes an electro-adhesive layer within a coupling between the battery and the electronic device. When a current a of predetermined magnitude is directed through the electro-adhesive between a first electrode and a second electrode, the electro-adhesive initiates a chemical reaction that weakens a bond between the battery and the electronic device.

16 Claims, 11 Drawing Sheets

ELECTRICAL BATTERY DE-BONDING

BACKGROUND

Mobile electronic devices often include rechargeable batteries with a finite effective lifetime. After some period of time and charge cycles, a rechargeable battery becomes unable to maintain its capacity and voltage within standard operating parameters. When an electronic device has a battery that is nearing the end of its effective lifetime, the device may charge inadequately and/or provide the user with a warning indicating that it is time to replace the battery. When this occurs, a user may take the electronic device to a technician to be serviced for battery replacement.

SUMMARY

A system includes an electronic device, a battery, and a layer of electro-adhesive within a coupling between the battery and the electronic device. When a current of predetermined magnitude is directed through the electro-adhesive between a first electrode and a second electrode, a chemical reaction weakens a bond between the battery and the electronic device, allowing the battery to be separated from the electronic device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Battery replacement can, in many cases, be time consuming due to the difficulty in separating the battery from the associated device without damaging the device and/or battery. In some cases, battery removal requires use of special tools with a potential to damage the device or the battery, preventing the battery from being refurbished and reused. Battery removal may also require special tools or environmental conditions that are difficult to provide outside of specially-designed facilities. In some cases, battery removal techniques inadvertently damage the battery and/or the electronic device.

The following description discloses various electrical de-bonding techniques that allow a battery to be removed from an associated electronic device quickly (e.g., in a manner of minutes), without special tooling, and without damaging the electronic device or the battery. According to one implementation, a battery is attached to an electronic device by an interface stack that includes a layer of electro-adhesive material. An electro-adhesive, also sometimes referred to as an electrical epoxy, is an adhesive that may release (de-bond) itself from an adjacent conductive layer when a current of predetermined magnitude is passed between two electrodes in contact with opposite sides of the electro-adhesive. This de-bonding is the result of a chemical reaction that occurs at an interface between the electro-adhesive and one of the electrodes.

Figure 1:
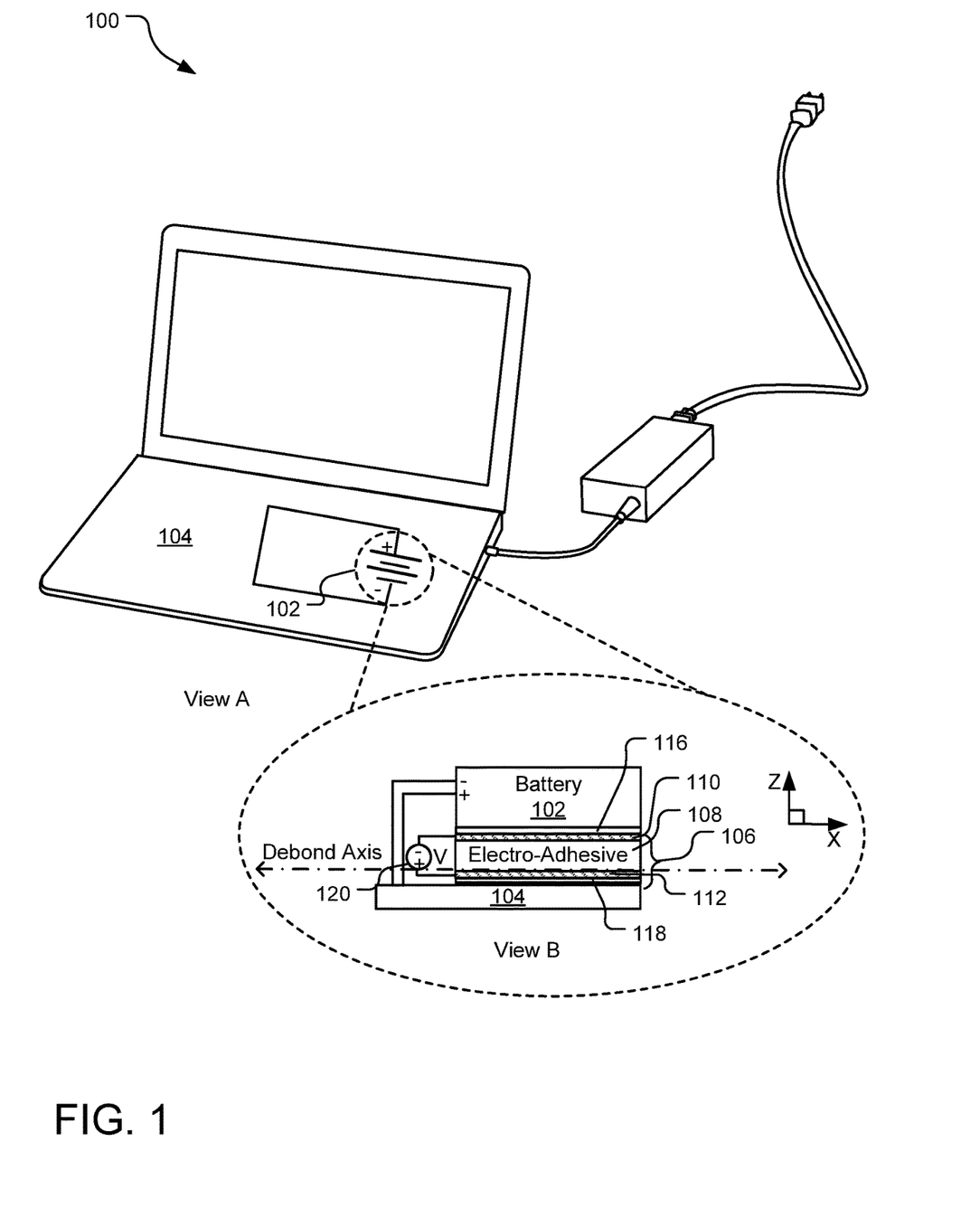
FIG. 1 illustrates one example electronic device including a battery that can be electrically de-bonded from an electronic device casing.

FIG. 1 illustrates one example electronic device 100 including a battery 102 that can be electrically de-bonded for detachment from an electronic device case 104. The electronic device 100 is shown be a laptop computer but may, in other implementations, be any type of electronic device that includes a rechargeable battery including without limitation a mobile phone, tablet, watch, appliance, toy, etc. The battery 102 may be any type of battery and include any number of battery cells. The battery 102 includes positive and negative electrical leads that couple to and supply power to various load-drawing electronics of the electronic device.

As shown in view B, the battery 102 is coupled to the electronic device 100 (e.g., to a portion of device case 104) by an interface stack 106. The specific layers included in the interface stack 106 may vary in different implementations; however, the interface stack 106 includes at least an electro-adhesive layer 108 bonded to conductive layers 110, 112.

In general, the conductive layers 110, 112 are electrically conductive elements that may be formed from various materials including, without limitation metals, carbon-fiber composites, metal-filled adhesives and coatings, or conductive oxides. In one implementation, the conductive layers 110, 12 are layers of aluminum. In different implementations, the conductive layers 110, 112 may take on different forms. Although the conductive layers 110, 112 may be layers that are separate from the battery 102 and the electronic device case 104 (as shown), one or more both of these layers may, in some implementations, be formed by a conductive surface of the electronic device case 104 and/or a conductive coating on the battery 102.

The electro-adhesive layer 108 has opposing surfaces that are each in contact with one of the conductive layers 110 or 112. Further, each of the conductive layers 110, 112 has a surface facing away from the electro-adhesive layer 108 that is in contact with one of two insulating adhesive layers 116 and 118. The insulating adhesive layer 116 electrically isolates the conductive layer 110 from the battery 102 and the insulating adhesive layer 118 electrically isolates the conductive layer 112 from the electronic device case 104.

In one implementation, the interface stack 106 is attached to the battery 102 prior to insertion of the battery into the electronic device 100. For example, the interface stack 106 may be formed independent of the battery 102 and subsequently adhered to the battery 102, such as during an assembly line process. In another implementation, the interface stack 106 is formed on the battery 102. These various implementations are explored with respect to FIG. 2-5, below.

To remove the battery 102 from the electronic device 100, terminals of a voltage source 120 are connected to the conductive layers 110, 112, which act as positive and negative electrodes that transmit a low current through the electro-adhesive layer 108. In one implementation, the transmitted current is on the order of between about 10 and 100 mA. During this battery detachment process, a build-up of negatively-charged ions at an interface between the electro-adhesive layer 108 and the adjacent positively-charged conductive layer (e.g., either 110 or 112) causes a chemical reaction that weakens the adhesive bond at this interface, causing the electro-adhesive layer 108 to separate from the adjacent conductive layer (e.g., 110 or 112). Consequently, the battery 102 can be easily decoupled from the electronic device case 104 and lifted out of the electronic device 100. As may be appreciated, the location of the separation interface between the battery 102 and the device case 104 may occur between the electro-adhesive layer 108 and either one of the conductive layers 110, 112 depending on the selected polarity of the positive and negative electrodes.

The magnitude of this applied voltage differential may vary in different implementations according to product specifications for the electro-adhesive layer 108. The time for de-bonding is, in general, proportional to the magnitude of the applied voltage source. In one implementation where the electro-adhesive layer 108 is ElectRelease E3® or ElectRelease E4®, the electro-adhesive layer 108 de-bonds from the positive electrode at 10 seconds when 45 V are applied and 20 minutes when 15 V are applied. ElectRelease E3® and ElectRelease E4® represent just two of many electro-adhesive materials suitable for electrically de-bonding batteries according to the disclosed techniques.

In some implementations, a service technician manually couples the voltage source 120 to the conductive layers 110, 112, such as by coupling leads of a portable battery to these layers for the duration of the battery de-bonding process. This decoupling can be achieved using inexpensive easy-to-acquire tooling without risking damage to the battery.

In other implementations, such as the exemplary implementation discussed in detail below with respect to FIG. 3, the battery 102 is de-bonded from the electronic device 100 using the voltage source of the battery 102 rather than an external voltage source. In one such implementation, the battery 102 is included in a battery pack (not shown) that includes switching circuitry, such as a switch or transistor, within an electrical path extending between negative and positive leads of the battery 102. For example, the battery 102 may be included within a battery pack that includes a microprocessor configured to selectively initiate the electrical de-bonding process by altering a state of the switching circuitry, such as by flipping a switch or altering transistor output, thereby initiating a flow of current from the battery 102 that flows across the electro-adhesive layer 108 between the conductive layer 110 and the conductive layer 112. In this implementation, electrical battery de-bonding is achieved without the use of an external voltage source or any special tooling.

Notably, FIG. 1-5 exaggerate the relative proportions of exemplary interface stacks (e.g., the interface stack 106) relative to battery and device casing components for clarity of concept. In actual implementations, the interface stack 306 may be significantly thinner than the battery. In one implementation, the interface stack 306 has a thickness (e.g., z-direction in FIG. 1) between about 0.2 mm and 1.00 mm. This thickness may vary in different implementations based on factors such as the mass of the battery 102 and material conditions of the electronic device case 104 (e.g., flatness, roughness, material type, surface energy).

Figure 2:
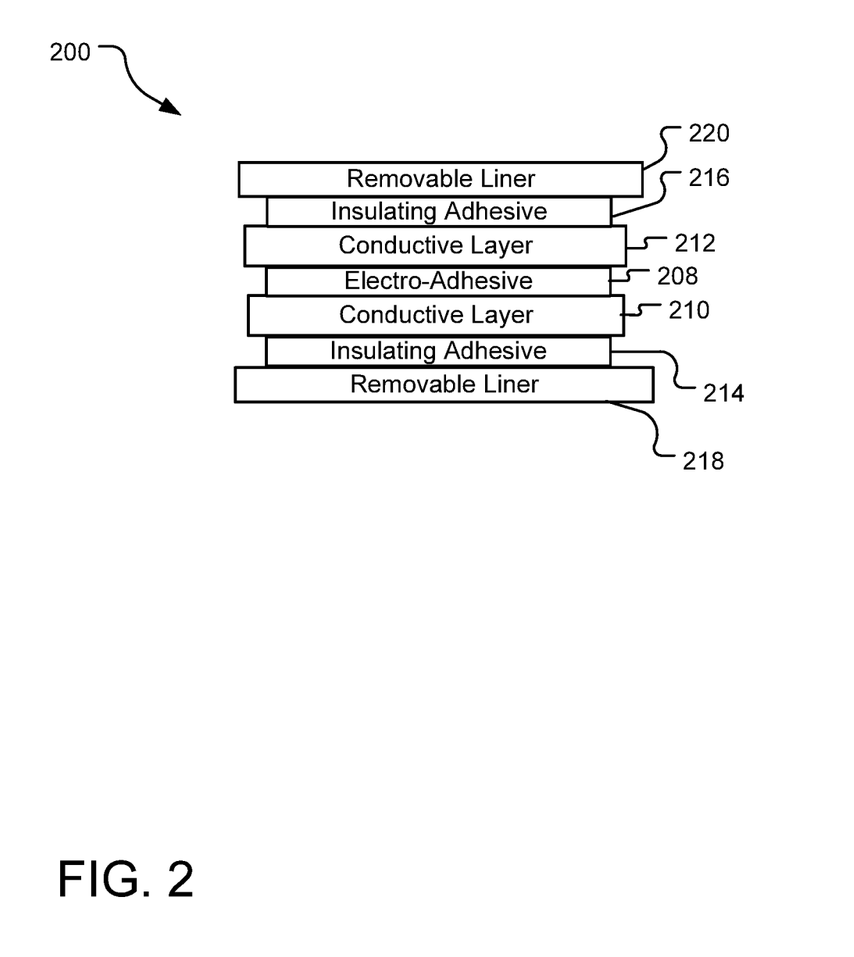
FIG. 2 illustrates an example interface stack for attaching and electrically de-bonding a battery to an electronic device.

FIG. 2 illustrates an example interface stack 200 for attaching and subsequently electrically de-bonding a battery (not shown) to an electronic device (not shown). In one implementation, the interface stack 200 is constructed by applying an electro-adhesive layer 208 on top of a conductive layer 210. Another conductive layer 212 is stacked on top of the applied electro-adhesive layer 208, and the electro-adhesive layer 208 is cured according to product specifications. Insulating adhesive layers 214 and 216 are deposited or otherwise applied on outward-facing surfaces of the conductive layers 210 and 212, and removable liners 218 and 220 are added to ends of the interface stack 200 to protect and preserve the adhesive properties of the insulating adhesive layers 214 and 216 until the interface stack 200 is to be bonded to a battery (not shown) and/or electronic device casing.

The insulating adhesive layers 214 and 216 may be formed of a variety of suitable materials including filmic carriers such as PET, PI, PVC, or PC with equivalent dielectric properties coated on both sides and acrylic or similar adhesive. In one implementation, the removable liners 218 and 220 include low-cost PET material with a modified silicone-doped coating to enable targeted release force during initial application.

Figure 3A:
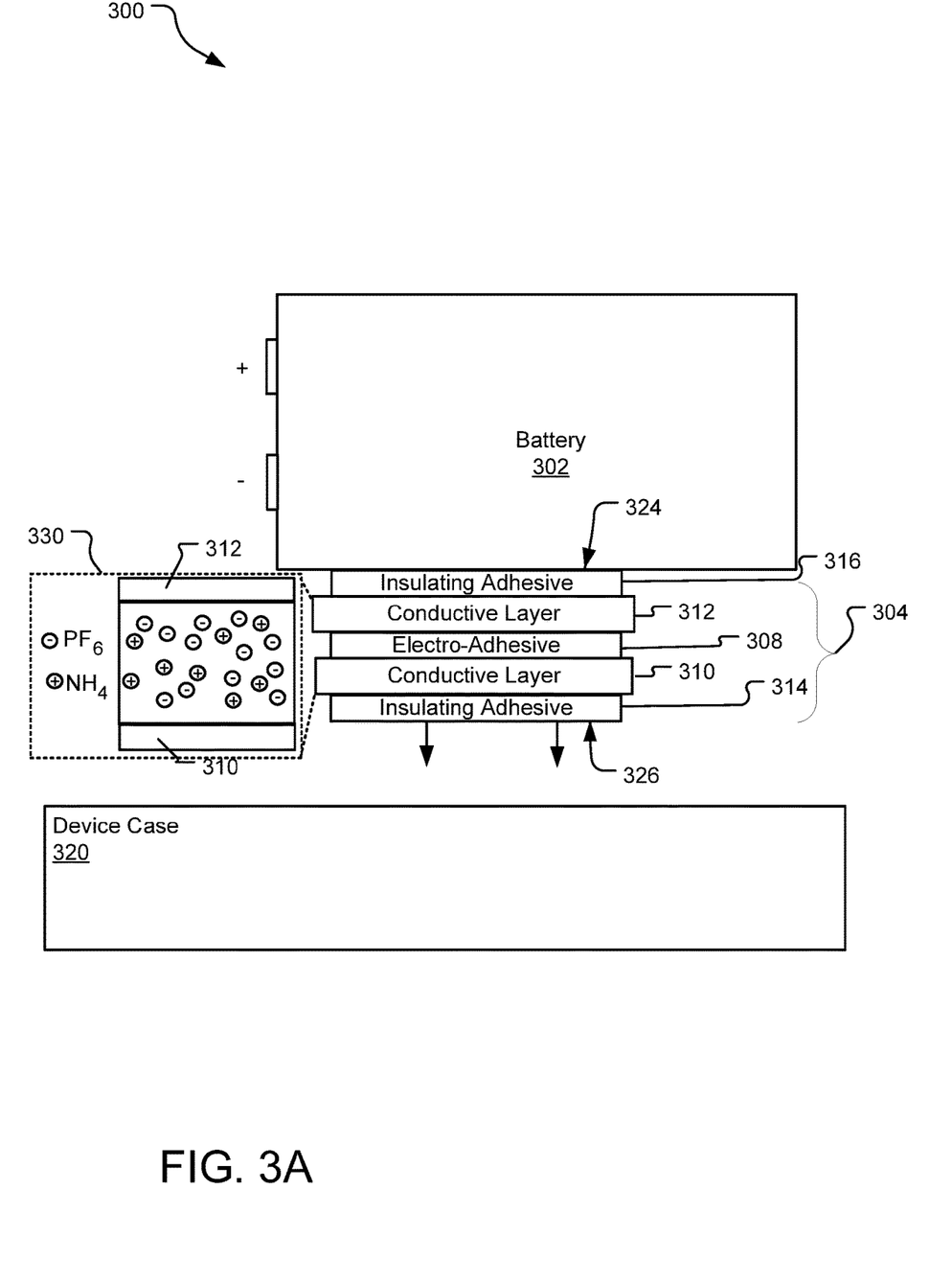
FIG. 3A illustrates an battery attachment step in an example electronic device including a battery that can be electrically de-bonded from an electronic device casing.

FIG. 3A illustrates a battery attachment step in an example electronic device including a battery 302 that can be electrically de-bonded from an electronic device case 320. The electronic device 300 includes an interface stack 304 that provides a coupling between the battery 302 to and the device case 320 when the battery used is used to power the device. According to one implementation, the interface stack 304 is the same as the interface stack 200 of FIG. 2 after the removable liners 218, 220 have been removed from the ends of the interface stack 200. During a battery attachment process, a first removable liner is removed from a surface 324 of an insulating adhesive layer 316 and the surface 324 of the insulating adhesive layer 316 is placed into contact with a battery 302.

In one implementation, the interface stack 304 is pre-assembled prior to an assembly process in which it is attached to the battery 302. For example, the insulating stack 304 may be formed in a first assembly process and shipped to another facility where the interface stack 304 is attached to the battery 302. When the interface stack 304 is pre-assembled in this manner, cure time of the electro-adhesive layer 308 is independent of the battery assembly time. Consequently, the interface stack 304 can be attached to the battery 302 as described above without slowing down the assembly line to wait for electro-adhesive layer 308 to cure on each product.

After the interface stack 304 is attached to the battery 302 as shown, this conjoined product may be attached to the device case 320. In one implementation, the conjoined structure (e.g., the interface stack 304 and the battery 302) is shipped to an electronic device manufacturer where it is inserted within and attached to an electronic device. At this step, a second removable liner (not shown) is removed from a surface 326 of the insulating adhesive layer 314, and the surface 326 of the insulating adhesive layer 314 is then placed into contact with a desired bonding area on the device surface 320. The device surface 320 may be, for example, a surface of an electronic device's casing or a PCB that is included within the electronic device 300.

A magnified view 330 in FIG. 3A illustrates an exemplary distribution of ions within the electro-adhesive layer 308 which has been cured between the conductive layers 310 and 312. Although a number of electro-adhesives with different compositions may be suitable for use in the disclosed technology, the exemplary electro-adhesive layer 308 includes positively-charged ammonium ions (NH4(+)) and negatively charged hexafluorophosphate ions (PF6 (−)).

Figure 3B:
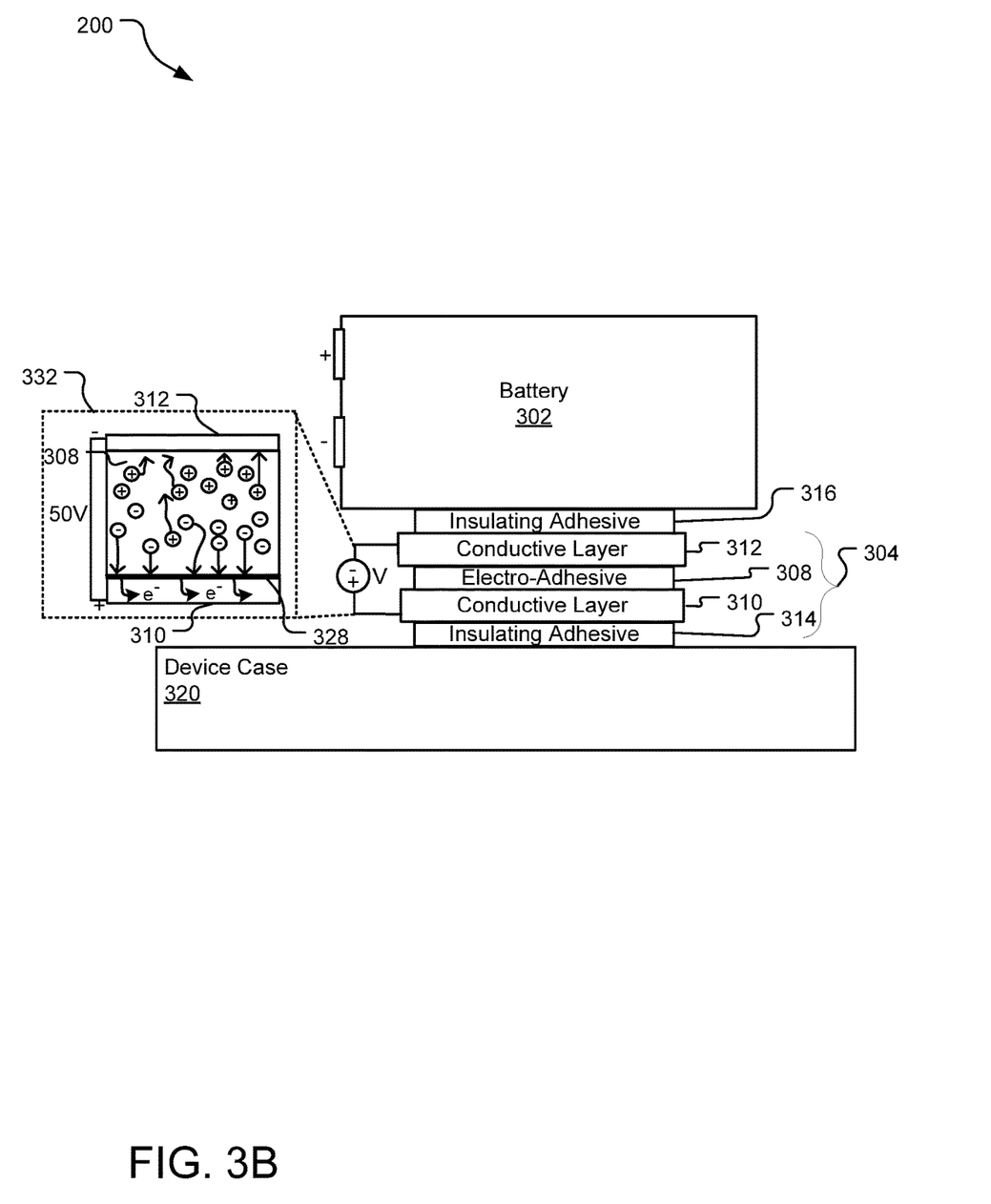
FIG. 3B illustrates a battery de-bonding step in the example electronic device of FIG. 3A.

FIG. 3B illustrates an example battery de-bonding step in the electronic device 300 of FIG. 3A. Once the battery 302 is no longer able to maintain its capacity and voltage within standard operating parameters, a user may take the electronic device to a technician to have the battery 304 replaced. The technician applies a voltage of predetermined magnitude across the electro-adhesive layer 308 by coupling each of the terminals of a voltage source 322 to one of the conductive layers 310, 312. In the example of FIG. 3B, the voltage source 322 applies a voltage differential of 50V.

As shown in a magnified view 332, the applied voltage differential between the conductive layers 310 and 312 causes positively-charged ions within the electro-adhesive layer 308 to be pulled toward the negatively-charged conductive layer 312 (e.g., the cathode) while negatively-charged ions are pulled toward the positively-charged conductive layer 310 (e.g., the anode). Due to a build-up of charge between the electro-adhesive layer 308 and the anode (e.g., the conductive layer 310), a chemical reaction occurs at an interface 328. This chemical reaction degrades the electro-adhesive layer 308 in this region and weakens its bond to the conductive layer 310.

The specific chemical reaction occurring at the interface 328 may, in different implementations, vary based on the composition of the electro-adhesive layer 308. However, in one implementation, the electro-adhesive layer 308 includes positively-charged ammonium ions (NH4(+)) and negatively charged hexafluorophosphate ions (PF6 (−)). In this implementation, negatively charged hexafluorophosphate ions (PF6) bond with hydrogen (H), releasing hydrogen fluoride (HF) and a free electron (e.g., $PF6+H=e^-+HF$). The hydrogen fluoride is a corrosive agent, which degrades the bond at the interface 328. The hydrogen for this reaction may, for example, reside in hydrogen bonds (OH—oxygen and hydrogen) that serve to attach the electro-adhesive 308 to the adjacent conductive surfaces 310 and 312. Additionally and/or alternatively, the hydrogen for this reaction may be derived from traces of moisture on the conductive layers 310, 312 before the bonds are made to the electro-adhesive layer 308.

Notably, other implementations of the disclosed technology may utilize electro-adhesive materials of different compositions that chemically react differently than in the example shown in FIGS. 3A-3D. In general, the location of the separation interface 328 depends on the material utilized for the electro-adhesive layer 308 and on the polarity selection of the electrodes.

In some cases, the chemical reaction may be such as to degrade the bond at the interface between the electro-adhesive layer 308 and the cathode rather than the anode. In still other implementations, polarity of the anode and cathode may be selectively reversed from that shown in FIG. 1-3. In an implementation where the chemical composition of the electro-adhesive 308 is the same as that shown in FIG. 3A-3D, swapping the polarity of the electrodes may cause the separation to occur the electro-adhesive layer 308 and the conductive layer 312 rather than between the electro-adhesive layer 308 and the conductive layer 310, as shown.

The amount of time for the de-bonding process to complete may be proportional to the magnitude of the applied voltage. In general, de-bonding occurs more quickly when the applied voltage is higher than when the applied voltage is lower. In one implementation where the electro-adhesive layer 308 is ElectRlease E4, de-bonding takes approximately 10 seconds when 45 V are applied and approximately 20 minutes when 15 V are applied.

Figure 3C:
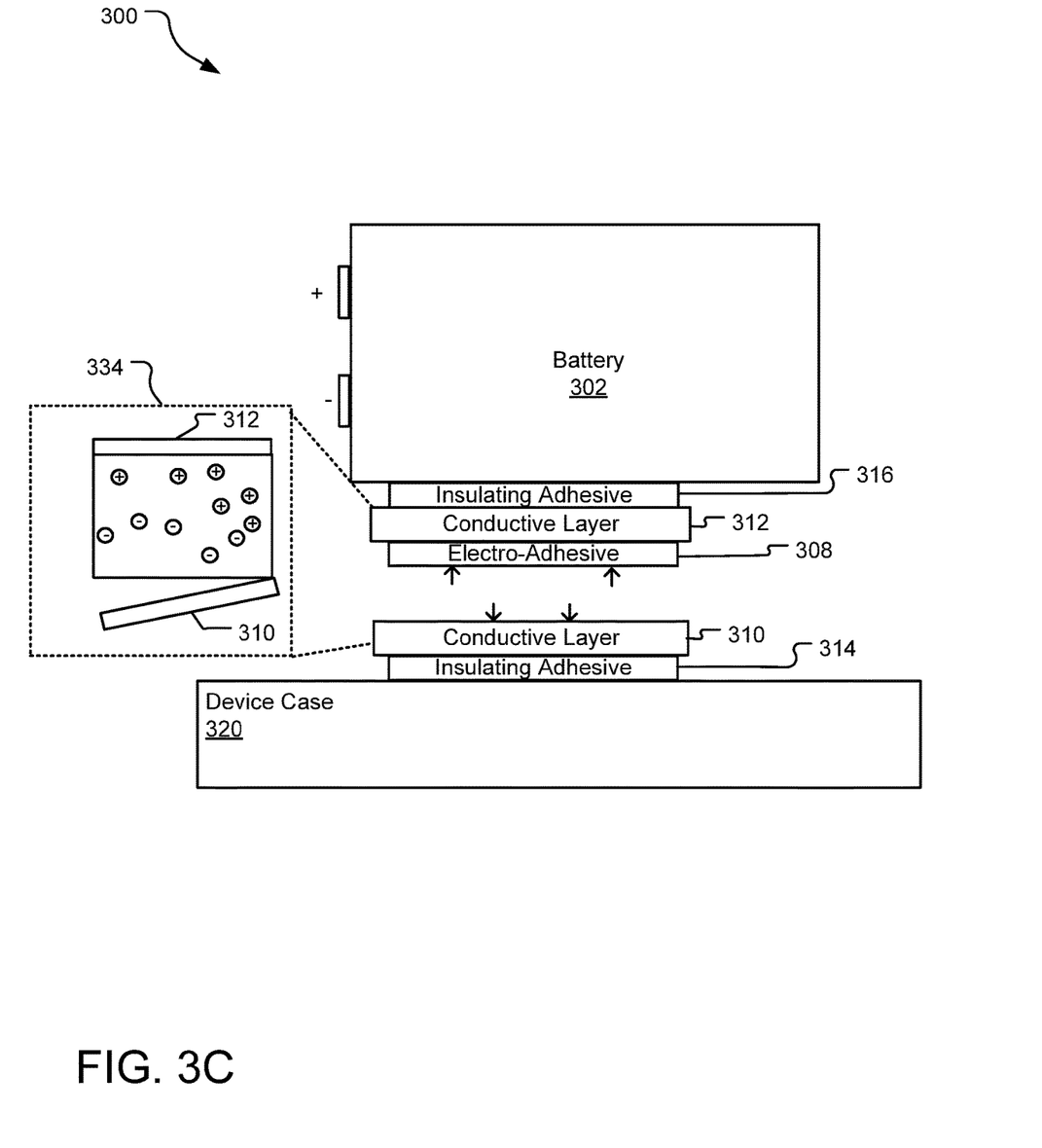
FIG. 3C illustrates a battery separation step in the example electronic device of FIGS. 3A-3B.

FIG. 3C illustrates an example battery separation step in the electronic device 300 of FIGS. 3A-3B. After a voltage source is applied to the conductive layers 310, 312 (as described above with respect to FIG. 2B), a bond weakens at the interface 328 between the electro-adhesive layer 308 and the conductive layer 310 (as shown in magnified view 334). This allows the battery 302 to be lifted away from the device case 320, such as by a wedge or tensile force applied by hand or with a tool such as pliers or vice-grips. An upper portion of the interface stack 304 (e.g., including the insulating adhesive layer 316, the conductive layer 312, and the remaining electro-adhesive layer 308), remains adhered to the battery 302. A lower portion of the interface stack 304 (e.g., including the conductive layer 310 and the insulating adhesive layer 314) remains attached to the device case 320. In one implementation, the residual conductive layer 310 may serve as a bonding surface to a new interface stack that is attached to a replacement battery, such as in the manner shown in FIG. 3D.

Figure 3D:
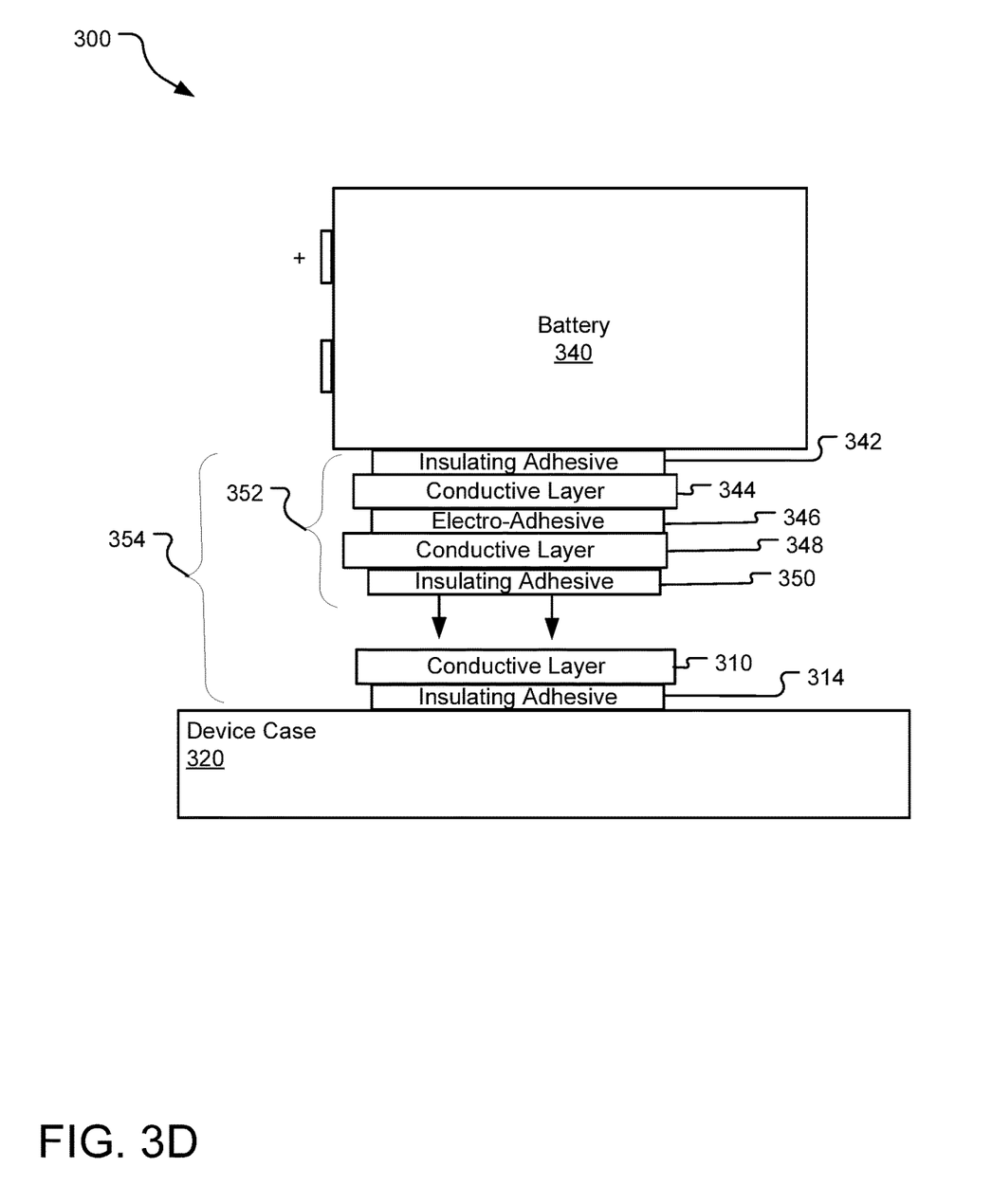
FIG. 3D illustrates an a battery replacement step in the electronic device of FIG. 3A-3C.

FIG. 3D illustrates a battery replacement step in the electronic device 300 of FIG. 3A-3C. Here, the battery 302 is being replaced with a new battery 340. The new battery 340 has been attached to a new interface stack 352 including insulating adhesive layers 342, 350, conductive layers 346 and 348, and an electro-adhesive layer 345. To couple the new battery 340 to the device case 320, the electro-adhesive layer 345 is placed into contact with the device case 320, as shown. The resulting structure is similar to that shown in FIGS. 3A and 3B with a slightly thicker interface stack 354 that includes three conducive layers (e.g., 310, 344, 348) instead of two.

Figure 4:
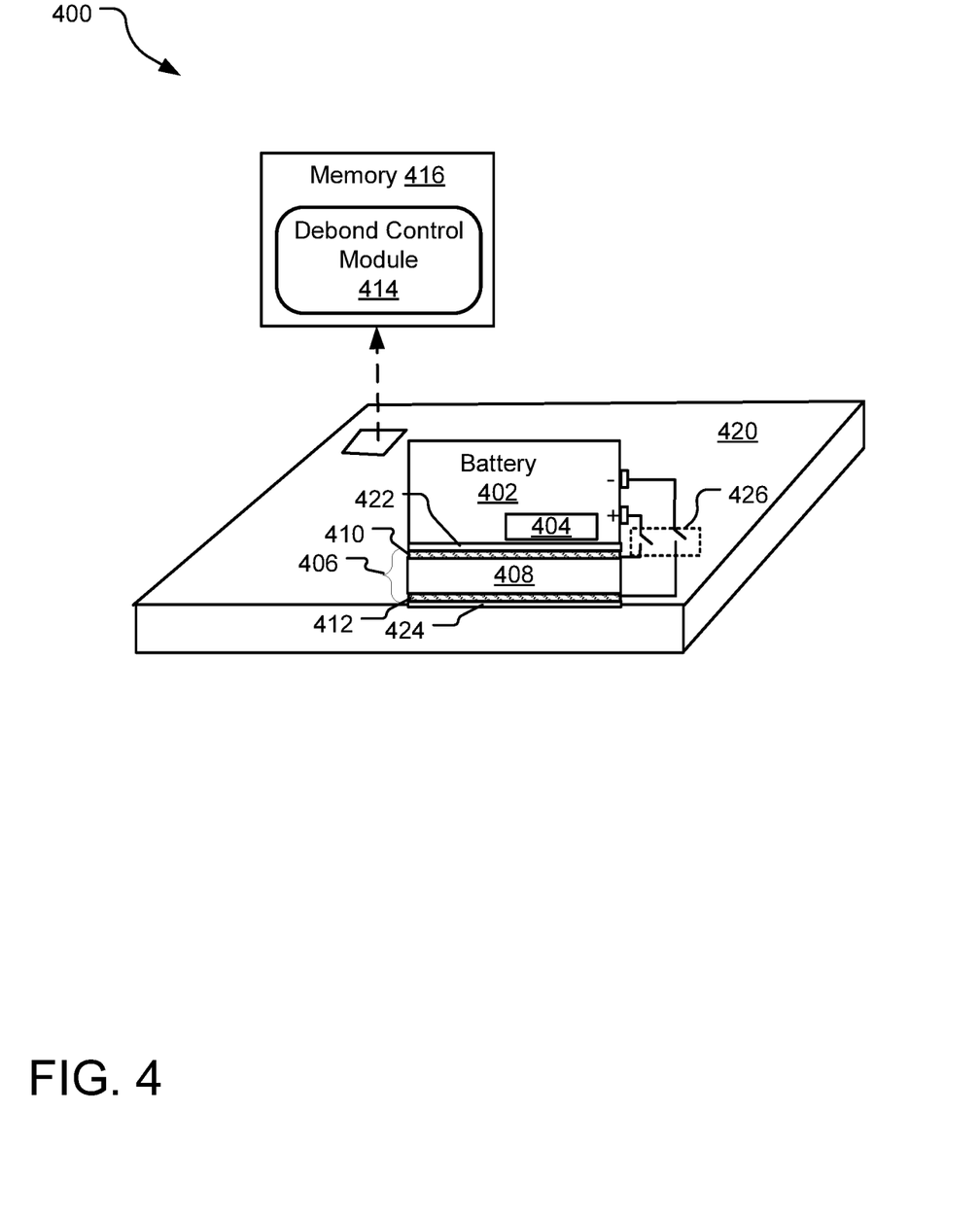
FIG. 4 illustrates an example electronic device that includes a battery configured to be electrically de-bonded from a device case without using an external voltage source.

FIG. 4 illustrates an example electronic device 400 that includes a battery 402 configured to be electrically de-bonded from a device case 420 of the electronic device 400 without using an external voltage source. Here, the battery 402 is included within a battery pack that includes a battery control module 404. The battery control module 404 includes at least a microprocessor for communicating with a de-bond control module 414 stored in memory 416 of the device 400 and for controlling switching circuitry 426, as described further below. In some implementations, the battery control module 404 is also configured to controlling various sensors that monitor battery parameters such as a state of charge, current, voltage, and temperature and to transmit such parameters to charge control circuitry within the electronic device 400 or an external charger.

In one implementation, the battery control module 404 selectively executes a firmware command sequence to control the switching circuitry 426 to perform a battery de-bonding process. For example, the battery control module 404 may control the switching circuitry 426 to initiate the battery de-bond process responsive to receipt of a software command from the de-bond control module 414. For example, the de-bond control module 414 may be part of a computer operating system that selectively transmits a software command to the battery control module 404 in the battery pack.

In FIG. 4, the battery 402 is shown coupled to the device case 420 by an interface stack 406 including layers that are the same or substantially the same as those shown and described with respect to FIGS. 3A and 3B. Specifically, the interface stack 406 includes upper and lower insulating adhesive layers 422, 424; upper and lower conductive layers 410 and 412; and an electro-adhesive layer 408 sandwiched between the upper and lower conductive layers 410 and 412. The conductive layers 410, 412 of the interface stack 406 are further coupled to the switching circuitry 426, which may assume a variety of forms in different implementations. In the example of FIG. 4, the switching circuitry 426 includes a first switch operable to connect the upper conductive layer 410 to the positive battery terminal and a second switch operable to connect the lower conductive layer 412 to the negative battery terminal. In other implementations, the switching circuitry 426 may include a single switch, a single transistor, or combinations of one or more switches and/or transistors.

When the battery control module 404 receives a de-bond initiation command from the de-bonding control module 414, the battery control module 404 controls the switching circuitry 426 to close both of the illustrated switches, effectively coupling the upper conductive layer 410 to the positive battery terminal and the lower conductive layer 412 to the negative battery terminal. This applied voltage difference causes current to flow through the electro-adhesive layer 408, initiating a chemical reaction that weakens the bond at an interface between the electro-adhesive layer 408 and the lower conductive layer 412, such as in the manner shown and described with respect to FIG. 3A-3C. This allows the battery 402 to be lifted off of the device case 420, such as in the manner generally described with respect to FIG. 3C.

The functionality of the battery control module 404 and switching circuitry 426 allows the battery 402 to be electrically de-bonded from the device case 420 without using an external voltage source. In one implementation, a technician initiates this de-bonding process by providing input (e.g., mouse, touch screen, or keyboard input) that instructs the de-bond control module 414 to transmit a command to the battery control module 404, triggering initiation of a firmware sequence. In another implementation, the de-bond control module 414 is not stored locally on the device 400. For example, the de-bond control module 414 may be a web-based application operable to communicate with the battery control module 404 to initiate the de-bonding process.

Figure 5:
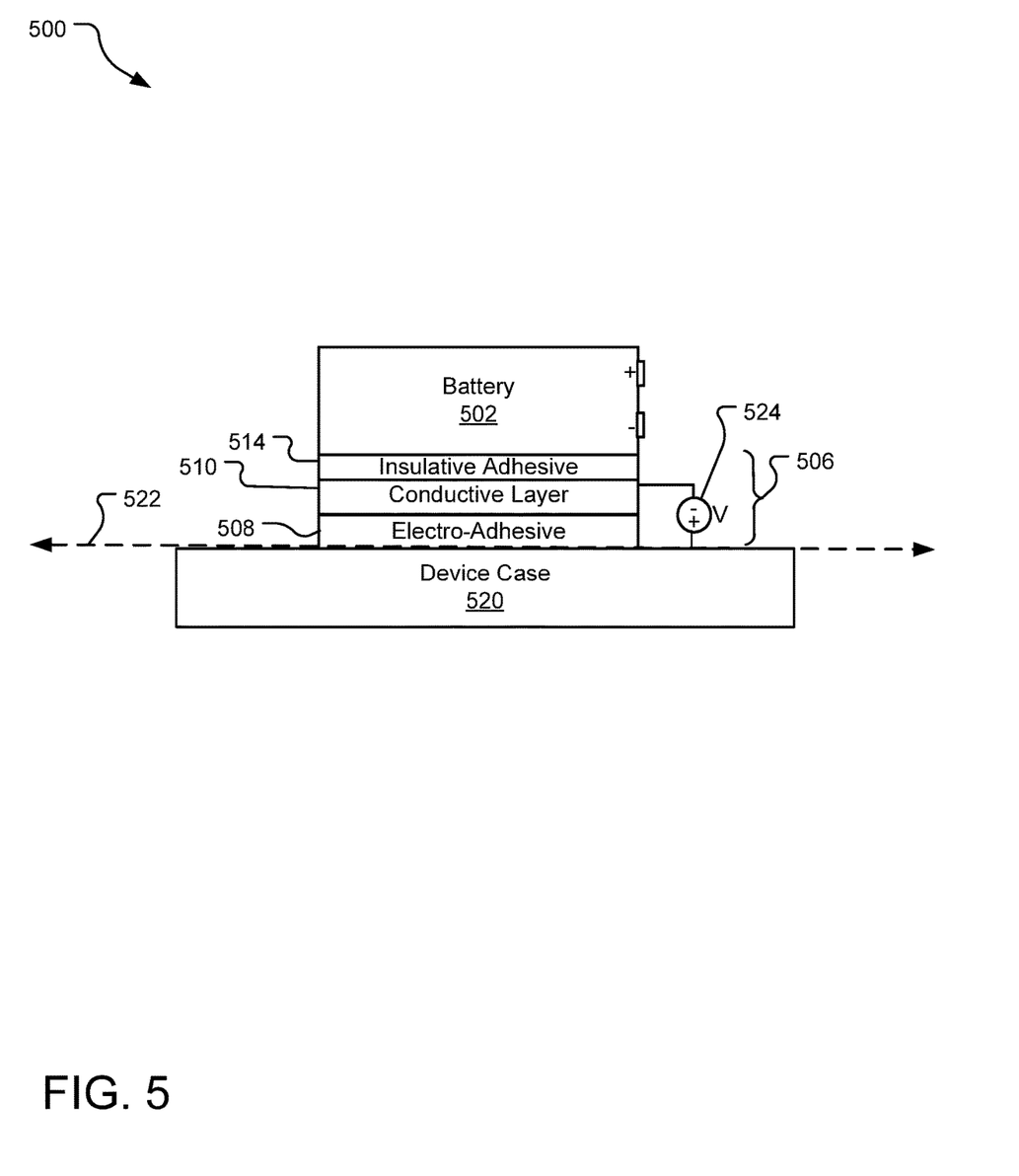
FIG. 5 illustrates another example electronic device with a battery that is configured to be electrically de-bonded from a device case of the electronic device.

FIG. 5 illustrates another example electronic device 500 with a battery 502 that is configured to be electrically de-bonded from a device case 520 of the electronic device 500. The battery 502 is coupled to the device case 520 by an interface stack 506 including an insulating adhesive 514, a conductive layer 510, and an electro-adhesive layer 508. In contrast to the implementations disclosed with respect to FIG. 3A-3D and FIG. 4, the interface stack 506 does not include a second conductive layer in addition to the conductive layer 510.

During a battery de-bonding process, a first terminal of a voltage source 524 is attached to the conductive layer 510 and a second terminal of the voltage source 524 is connected to a conductive surface of the device case 520. Here, the conductive surface of the device case 520 acts as a secondary electrode in lieu of a separate, secondary conductive layer in the interface stack 506. A predetermined voltage differential is applied, causing current to flow through the conductive layer to the conductive surface of the device case 520. This current flow generates a localized build-up of charge along a de-bond axis 522 at an interface between the device case 520 and the electro-adhesive layer 508. This build-up of charge eventually causes a chemical reaction that weakens the bond at this interface, allowing the battery 502 to be lifted off of the interface stack 506.

In FIG. 5, the exclusion of a second conductive layer from the interface stack 506 allows for a thinner interface stack 506 (e.g., thinner in a direction perpendicular to the de-bond axis 522) that consumes less space within the device case 520 than in those implementations shown in FIG. 3A-3D and FIG. 4. This decrease in thickness of the interface stack 506 allows more space in a battery pack to be devoted to battery capacity. However, this implementation may not be suitable for electronic devices that lack a sufficiently conductive surface that may couple to the battery terminal and serve as the secondary electrode.

In one implementation, the interface stack 506 is formed on the device case 520. For example, the electro-adhesive layer 508 and conductive layer 510 are layered on the device case 520, and time is then allotted to permit the electro-adhesive layer to cure according to product specifications. Subsequently, the adhesive layer 514 is layered on top of the conductive layer 512 and placed into contact with the battery 502.

In one implementation, the voltage source 524 is an external voltage source separate from the battery 502. In another implementation, an internal voltage source of the battery 502 serves as the voltage source 524 for the battery de-bonding process. This may be the case when, for example, a battery subassembly is pre-formed prior to attachment of the battery 502 to the device case 520. For example, the pre-formed battery subassembly may include the battery 502, the insulating adhesive 514, the conductive layer 510, and an integrated control circuit (not shown), such as a circuit that includes switching circuitry the same or similar to switching circuitry 426 of FIG. 4. After the electro-adhesive layer 508 is applied to the device case 520, the battery subassembly may then be installed on top of the electro-adhesive layer 508 and the integrated control circuit may be electrically coupled (closed) to the device case 520. In this implementation, the battery can be selectively de-bonded from the device case 520 by controlling the integrated control circuit to flow current along a path between the conductive layer 510 and the device case 520, such as in the manner described above with respect to FIG. 4.

Figure 6:
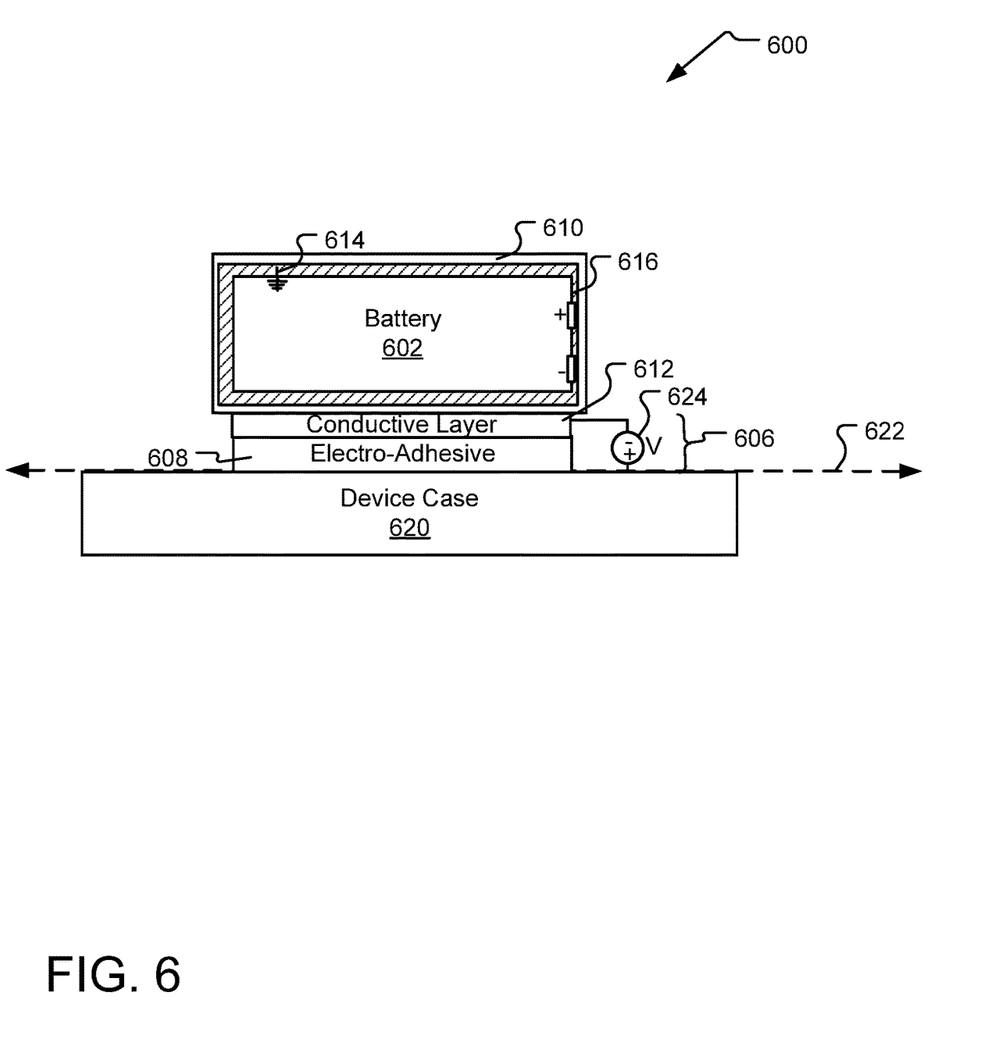
FIG. 6 illustrates another example device with a battery that can be electrically de-bonded from an electronic device case.

FIG. 6 illustrates another example device 600 including a battery 602 that can be electrically de-bonded from a device case 620 of the device. The battery 602 is a pouch cell battery that includes a roll of active material encased along with an electrolyte within a conductive battery pouch 616 that is internally grounded (e.g., at an electrical ground 614). To prevent inadvertent discharge of the battery 602, the conductive battery pouch 616 is coated with an insulating layer 610. In one implementation, the conductive battery pouch 616 has an aluminum exterior and the insulating layer 610 is a thin layer of nylon coating the aluminum exterior.

In FIG. 6, the battery 602 is attached to a device case 620 by an interface stack 606 that consists of a two layers—an electro-adhesive layer 608 and a conductive coating 612. The conductive coating 612 is layered directly on an insulating layer 610 of the battery pouch in a targeted region that is to be placed into contact with the electro-adhesive layer 608. For example, the conductive coating 612 may be applied using a variety of techniques such as deposition, brush, print, or spray techniques.

In this implementation, the insulating coating 610 on the conductive battery pouch 616 electrically isolates the battery 602 from the electro-adhesive layer 608. The electro-adhesive layer 608 applied to the device case 620 and the battery 602 is attached to the device case 620 such that the conductive layer is in contact with the electro-adhesive, as shown, and the electro-adhesive 608 is cured according to product specifications.

During a battery de-bonding process, a first terminal of a voltage source 624 is attached to a lead on the conductive coating 612. A second terminal of the voltage source 624 is attached to the conductive surface of the device case 620. A predetermined voltage differential is applied to initiate a flow of current through the electro-adhesive layer 608 toward the negatively-charged terminal. This current flow creates a build-up of charge along a de-bond axis 622.

Notably, the location of the de-bond axis 622 depends on the orientation of the terminals of the voltage source 624. In FIG. 6, the negatively charged terminal is shown to be the terminal attached to the device case 620. In this implementation, the de-bond axis 622 is between the device case 620 and the electro-adhesive layer 608. When the battery 602 is lifted off the device case 620, the layers of the interface stack 606 remain adhered to battery 602. This leaves the device case 620 clean and ready to receive a replacement battery.

Like the implementation of FIG. 5, the battery 602 may be de-bonded from the device case 620 using either an external voltage source or the internal voltage of the battery 602. In one implementation where the battery's own voltage services as the voltage source 624, a battery subassembly is formed prior to attachment of the battery 602 to the device case 620. For example, the battery subassembly may include the insulating layer 610, the conductive layer 612, an integrated control circuit (not shown), such as a circuit including switching circuitry the same or similar to the switching circuitry 426 of FIG. 4. After the electro-adhesive layer 608 is applied to the device case 620, the battery subassembly may then be installed on top of the electro-adhesive layer 608 and the integrated control circuit may be electrically coupled (closed) to the device case 620. The battery 602 can be selectively de-bonded from the device case 620 by controlling the integrated control circuit to flow current along a path between the conductive layer 610 and the device case 620, such as in the manner described above with respect to FIG. 4.

Figure 7:
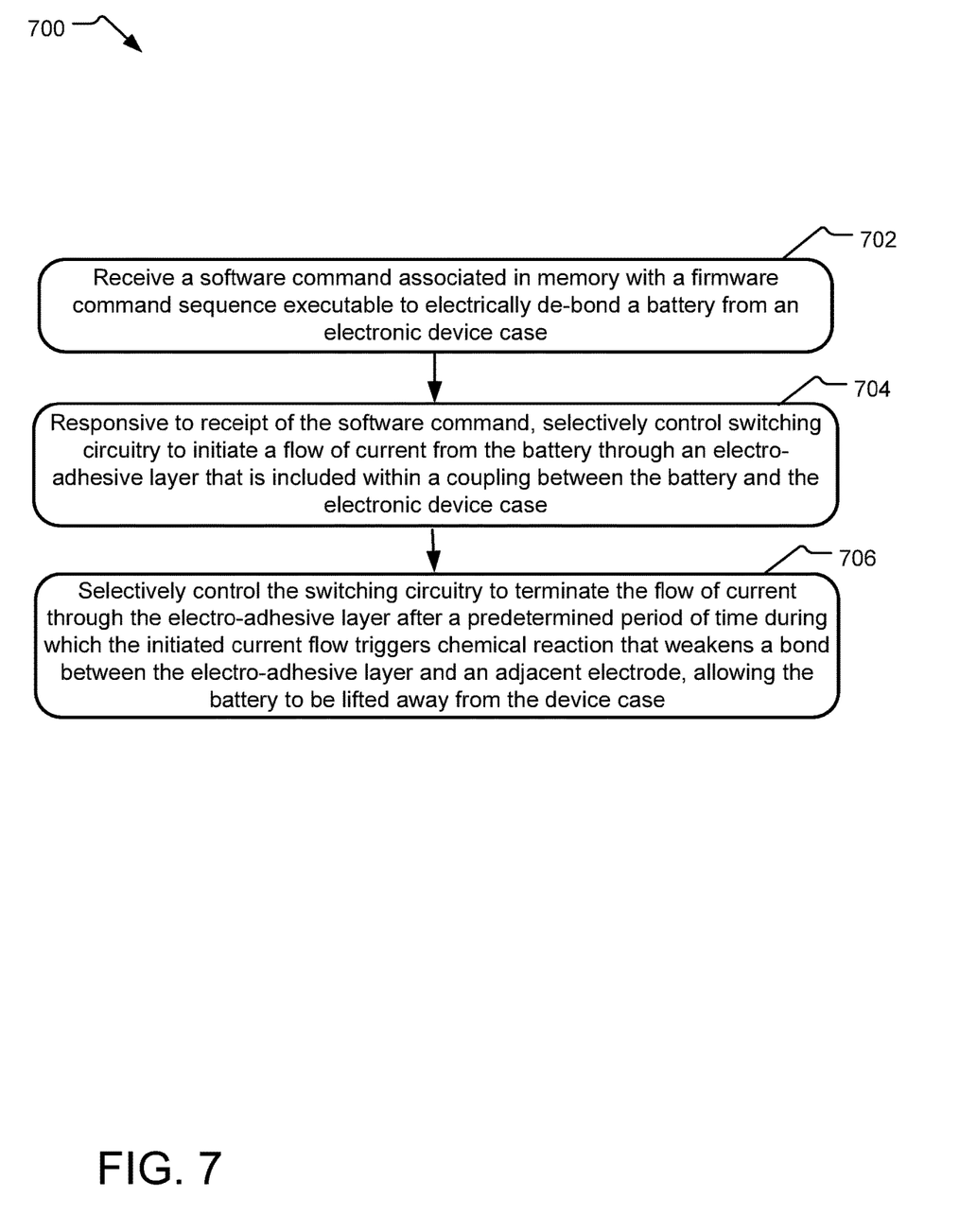
FIG. 7 illustrates example operations for electrically de-bonding a battery from an electronic device case.

FIG. 7 illustrates example operations 700 for electrically de-bonding a battery from an electronic device case. According to one implementation, the operations 700 are performed by a processor of a battery control module included within a battery pack of the battery. A receiving operation 702 receives a software command from a processor of a computing device. For example, the command may be transmitted by a processor within the electronic device that is powered by the battery. The software command initiates a firmware command sequence for electrically de-bonding the battery from the electronic device case.

Responsive to receipt of the software command, a switching operation 704 carries out a latter portion of the firmware command sequence by controlling switching circuitry to initiate a flow of current from the battery through an electro-adhesive layer that is included within a coupling between the battery and the electronic device.

Another switching operation 706 carries out a second portion of the firmware command sequence by controlling the switching circuitry to cease the flow of current through the electro-adhesive layer after a predetermined period of time has elapsed. In one implementation, the amount of time elapsed between execution of the switching operation 704 and the switching operation 706 depends upon the available charge in the battery. For example, a table within the battery pack may associate different predetermined periods of time with different battery charge levels, where each period of time is a period deemed sufficient for the current flow (having a magnitude based on the battery charge level) to trigger a chemical reaction that weakens a bond between the electro-adhesive layer and an adjacent electrode by an amount sufficient to permit a service technician or other individual to manually lift the battery away from the device casing, such as by applying a wedge or tensile force by hand or with a tool such as pliers or vice-grips.

Figure 8:
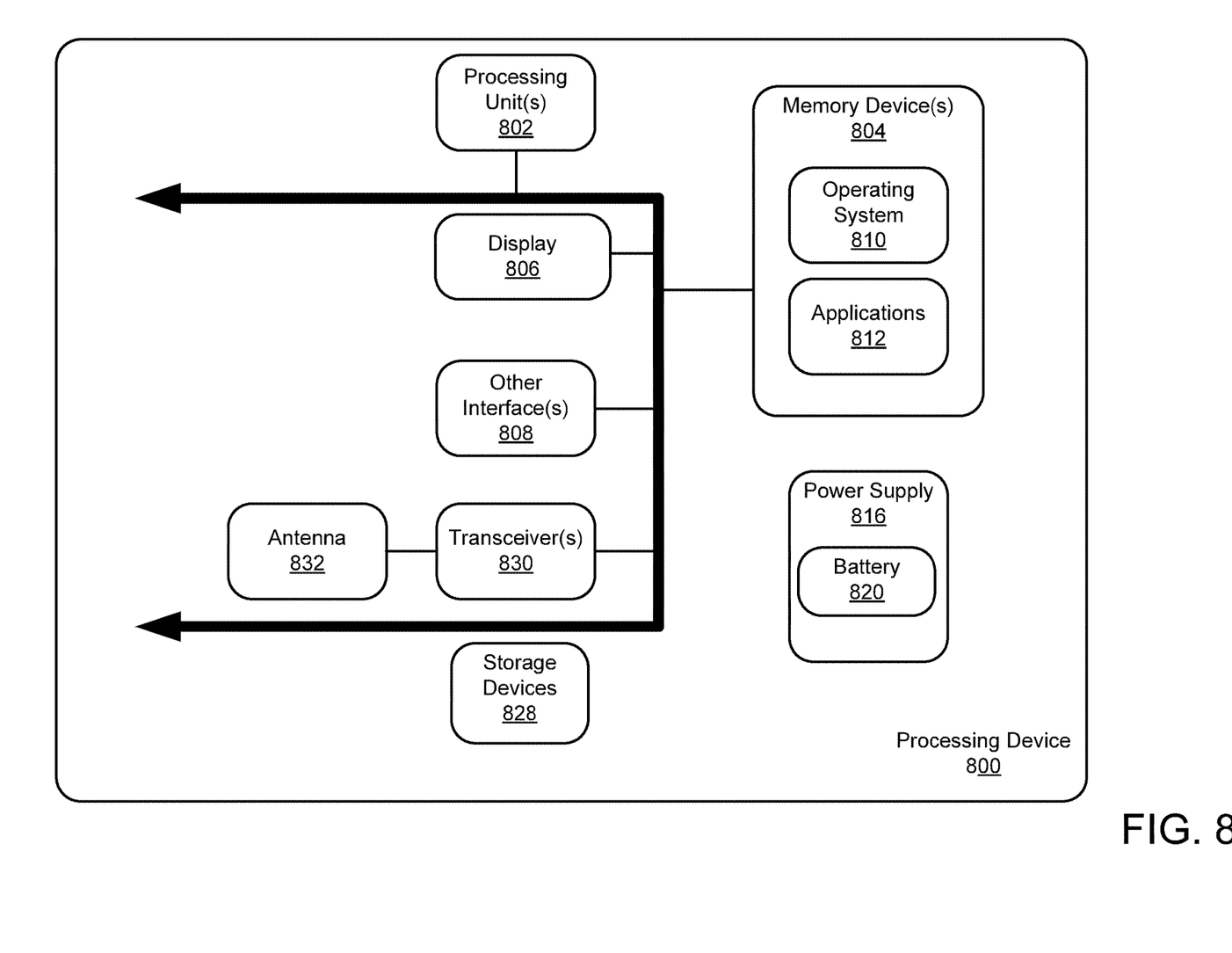
FIG. 8 illustrates an example schematic of a processing device suitable for implementing aspects of the disclosed technology.

FIG. 8 illustrates an example schematic of a processing device 800 suitable for implementing aspects of the disclosed technology. The processing device 800 includes one or more processor unit(s) 802, memory 804, a display 806, and other interfaces 808 (e.g., buttons). The memory 804 generally includes both volatile memory (e.g., RAM) and non-volatile memory (e.g., flash memory). An operating system 810, such as the Microsoft Windows® operating system, the Microsoft Windows® Phone operating system or a specific operating system designed for a gaming device, resides in the memory 804 and is executed by the processor unit(s) 802, although it should be understood that other operating systems may be employed.

One or more applications 812, such as the de-bond control module 414 of FIG. 4, are loaded in the memory 804 and executed on the operating system 810 by the processor unit(s) 802. In one implementation, a de-bond control module (e.g., 414 of FIG. 4) is included within the operating system 810.

Applications 812 may receive input from various input local devices such as a microphone 834, input accessory 835 (e.g., keypad, mouse, stylus, touchpad, gamepad, racing wheel, joystick). Additionally, the applications 812 may receive input from one or more remote devices, such as remotely-located smart devices, by communicating with such devices over a wired or wireless network using more communication transceivers 830 and an antenna 838 to provide network connectivity (e.g., a mobile phone network, Wi-Fi®, Bluetooth®).

The processing device 800 further includes storage device 828 and a power supply 816, which is powered by one or more batteries (e.g., a battery 820) and/or other power sources and which provides power to other components of the processing device 800. In one implementation, the battery 820 includes a power control module (e.g., the battery control module 404 of FIG. 4) to selectively control switching circuitry to initiate electrical de-bonding of the battery 820 from the processing device 800.

The power supply 816 may also be connected to an external power source (not shown) that overrides or recharges the built-in batteries or other power sources. In an example implementation, a de-bond control module includes hardware and/or software embodied by instructions stored in the memory 804 and/or storage devices 828 and processed by the processor unit(s) 802. The memory 804 may be the memory of a host device or of an accessory that couples to the host.

The processing device 800 may include a variety of tangible computer-readable storage media and intangible computer-readable communication signals. Tangible computer-readable storage can be embodied by any available media that can be accessed by the processing device 800 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 800. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example system disclosed herein includes an electronic device; a battery coupled to the electronic device; and an electro-adhesive layer included within a coupling between the battery and the electronic device. The electro-adhesive layer is of a composition that chemically reacts to weaken a bond at an interface between the battery and the electronic device when a current of predetermined magnitude is directed through the electro-adhesive layer between a first electrode and a second electrode, the weakened bond causing a separation between the battery and the electronic device.

In an example system of any preceding system, the first electrode and the second electrode are layers included in an interface stack between the battery and the electronic device. The interface stack includes a first insulating layer separating the first electrode from the battery and a second insulating layer separating the second electrode from the electronic device.

In another example system of any preceding system, the first electrode is a conductive surface of the electronic device.

In still another example system of any preceding system, the first electrode is a conductive surface of the electronic device and the second electrode is a conductive coating formed on a battery pouch of the battery.

In another example system of any preceding system, the system further comprises switching circuitry selectively controllable to initiate a current flow of predetermined magnitude between the first electrode and the second electrode through the electro-adhesive layer.

In yet still another example system of any preceding system, the switching circuitry includes at least one of a switch and a transistor.

An example method disclosed herein includes applying a voltage differential between a first electrode and a second electrode contacting opposite surfaces of an electro-adhesive layer to initiate a chemical reaction at an interface between a battery and an electronic device and removing the voltage differential from the first electrode and the second electrode after a predetermined period of time during which the chemical reaction weakens a bond at the interface to facilitate separation between the battery and the electronic device at the interface In another example method of any preceding method, the first electrode and the second electrode are layers included in an interface stack between the battery and the electronic device. The interface stack includes a first insulating layer separating the first electrode from the battery and a second insulating layer separating the second electrode from the electronic device.

In still another example method of any preceding method, the first electrode is a conductive surface of the electronic device and the second electrode is included in an interface stack between the battery and the electronic device.

In yet still another example method of any preceding method, the first electrode is a conductive surface of the electronic device and the second electrode is a conductive coating formed on a battery pouch of the battery.

In another example method of any preceding method, applying the voltage differential further includes applying a first terminal of an external voltage source to the first electrode and a second terminal of the external voltage source to the second electrode.

In still another example method of any preceding method, applying the voltage differential further includes controlling switching circuitry to initiate a current flow of predetermined magnitude between the first electrode and the second electrode across the electro-adhesive layer.

In another example method of any preceding method, the voltage differential is applied responsive to receipt of a software command.

In another example method of any preceding method, the battery includes a battery control module to selectively operate the switching circuitry responsive to receipt of a command received from a processor.

An example electronic device disclosed herein comprises a processor; memory; an electro-adhesive layer between a battery and the electronic device; and a battery control module stored in the memory and executable by the processor to control switching circuitry to initiate a flow of current across the electro-adhesive layer between a first electrode and a second electrode, the flow of current initiating a chemical reaction that weakens a bond at an interface between the battery and the electronic device to facilitates separation of the battery from the electronic device.

In another electronic device according to any preceding electronic device, the first electrode and the second electrode are included in an interface stack between the battery and the electronic device. The interface stack includes a first insulating layer separating the first electrode from the battery and a second insulating layer separating the second electrode from the electronic device.

In yet still another electronic device according to any preceding electronic device, the flow of current originates from the battery.

In still another electronic device of any preceding electronic device, the switching circuitry is operable to selectively couple the first electrode to a first terminal of the battery and to selectively couple the second electrode to a second terminal of the battery.

In yet still another electronic device according to any preceding electronic device, the switching circuitry is included within a battery pack of the battery.

In another electronic device according to any preceding electronic device, the switching circuitry includes at least one of a switch and a transistor along an electrical path between the first electrode and the second electrode.

An example system disclosed herein includes a means for applying a voltage differential between a first electrode and a second electrode contacting opposite surfaces of an electro-adhesive layer to initiate a chemical reaction at an interface between a battery and an electronic device. The example system further includes a means for removing the voltage differential from the first electrode and the second electrode after a predetermined period of time during which the chemical reaction weakens a bond at the interface to facilitate separation between the battery and the electronic device at the interface.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
   an electronic device;
   a battery coupled to the electronic device; and
   an electro-adhesive layer included within a coupling between the battery and the electronic device, the electro-adhesive layer being of a material that chemically reacts to weaken a bond at an interface between the battery and the electronic device when a current of predetermined magnitude is directed through the electro-adhesive layer between a first electrode and a second electrode, the weakened bond facilitating separation of the battery from the electronic device; and
   switching circuitry selectively controllable to initiate a current flow of predetermined magnitude between the first electrode and the second electrode through the electro-adhesive layer; and
   a processor coupled to the battery, the processor configured to control the switching circuitry to selectively initiate de-bonding of the battery from the electronic device.

2. The system of claim 1, wherein the first electrode and the second electrode are layers included in an interface stack between the battery and the electronic device, the interface stack including a first insulating layer separating the first electrode from the battery and a second insulating layer separating the second electrode from the electronic device.

3. The system of claim 1, wherein the first electrode is a conductive surface of the electronic device.

4. The system of claim 1, wherein the first electrode is a conductive surface of the electronic device and the second electrode is a conductive coating formed on a battery pouch of the battery.

5. The system of claim 1, wherein the battery includes a battery control module to selectively operate the switching circuitry responsive to receipt of a command received from the processor.

6. The system of claim 1, wherein the switching circuitry includes at least one of a switch and a transistor.

7. A method comprising:
   receiving, at a processor, a command instructing initiation of de-bonding operation to decouple a battery from an electronic device;
   responsive to receipt of the command, controlling switching circuitry to apply a voltage differential between a first electrode and a second electrode contacting opposite surfaces of an electro-adhesive layer, the application of the voltage effective to initiate a current flow of predetermined magnitude across the electro-adhesive layer and a chemical reaction at an interface between the battery and the electronic device; and
   removing the voltage differential from the first electrode and the second electrode after a predetermined period of time during which the chemical reaction weakens a bond at the interface to facilitate separation of the battery from the electronic device at the interface.

8. The method of claim 7, wherein the first electrode and the second electrode are layers included in an interface stack between the battery and the electronic device, the interface stack including a first insulating layer separating the first electrode from the battery and a second insulating layer separating the second electrode from the electronic device.

9. The method of claim 7, wherein the first electrode is a conductive surface of the electronic device and the second electrode is included in an interface stack between the battery and the electronic device.

10. The method of claim 7, wherein the first electrode is a conductive surface of the electronic device and the second electrode is a conductive coating formed on a battery pouch of the battery.

11. The method of claim 7, wherein applying the voltage differential further comprises:
applying a first terminal of an external voltage source to the first electrode and a second terminal of the external voltage source to the second electrode.

12. An electronic device comprising:
a processor;
memory;
an electro-adhesive layer between a battery and the electronic device;
a battery control module stored in the memory and executable by the processor to control switching circuitry to initiate a flow of current across the electro-adhesive layer between a first electrode and a second electrode, the flow of current initiating a chemical reaction that weakens a bond at an interface between the battery and the electronic device to facilitates separation of the battery from the electronic device, the switching circuitry being operable to selectively couple the first electrode to a first terminal of the battery and to selectively couple the second electrode to a second terminal of the battery.

13. The electronic device of claim 12, wherein the first electrode and the second electrode are included in an interface stack between the battery and the electronic device, the interface stack including a first insulating layer separating the first electrode from the battery and a second insulating layer separating the second electrode from the electronic device.

14. The electronic device of claim 12, wherein the flow of current originates from the battery.

15. The electronic device of claim 12, wherein the switching circuitry is included within a battery pack of the battery.

16. The electronic device of claim 12, wherein the switching circuitry includes at least one of a switch and a transistor along an electrical path between the first electrode and the second electrode.

* * * * *